(12) United States Patent
Kaneko

(10) Patent No.: US 12,719,993 B2
(45) Date of Patent: Aug. 25, 2026

(54) DEVICE MANAGEMENT SERVICE SYSTEM, CONTROLLING METHOD OF DEVICE MANAGEMENT SERVICE SYSTEM, AND STORAGE MEDIUM

(71) Applicant: CANON KABUSHIKI KAISHA, Tokyo (JP)

(72) Inventor: Tsuyoshi Kaneko, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 18/400,902

(22) Filed: Dec. 29, 2023

(65) Prior Publication Data

US 2024/0236246 A1 Jul. 11, 2024

(30) Foreign Application Priority Data

Jan. 5, 2023 (JP) ................................ 2023-000457

(51) Int. Cl.
*H04N 1/00* (2006.01)
*H04L 41/5051* (2022.01)

(52) U.S. Cl.
CPC ..... *H04N 1/00344* (2013.01); *H04L 41/5051* (2013.01); *H04N 1/00037* (2013.01)

(58) Field of Classification Search
USPC ........................................................ 358/1.15
See application file for complete search history.

(56) References Cited

U.S. PATENT DOCUMENTS

| | | | | |
|---|---|---|---|---|
| 2018/0240275 | A1* | 8/2018 | Clements | G16H 80/00 |
| 2022/0383399 | A1* | 12/2022 | Lasater | G06Q 30/0643 |
| 2024/0137380 | A1* | 4/2024 | Kelly | H04L 63/102 |
| 2024/0214371 | A1* | 6/2024 | Doken | H04L 63/083 |

FOREIGN PATENT DOCUMENTS

| | | |
|---|---|---|
| JP | 2022002387 A | 1/2022 |

* cited by examiner

*Primary Examiner* — Jacky X Zheng
(74) *Attorney, Agent, or Firm* — Canon U.S.A., Inc. IP Division

(57) ABSTRACT

When a notification event occurs in an image processing apparatus installed in a real world, a device management tool/service notifies a content of the notification event to an administrator avatar of the image processing apparatus in a virtual office as a device management avatar, and accepts an instruction from the administrator avatar via the device management avatar in the virtual office.

12 Claims, 6 Drawing Sheets

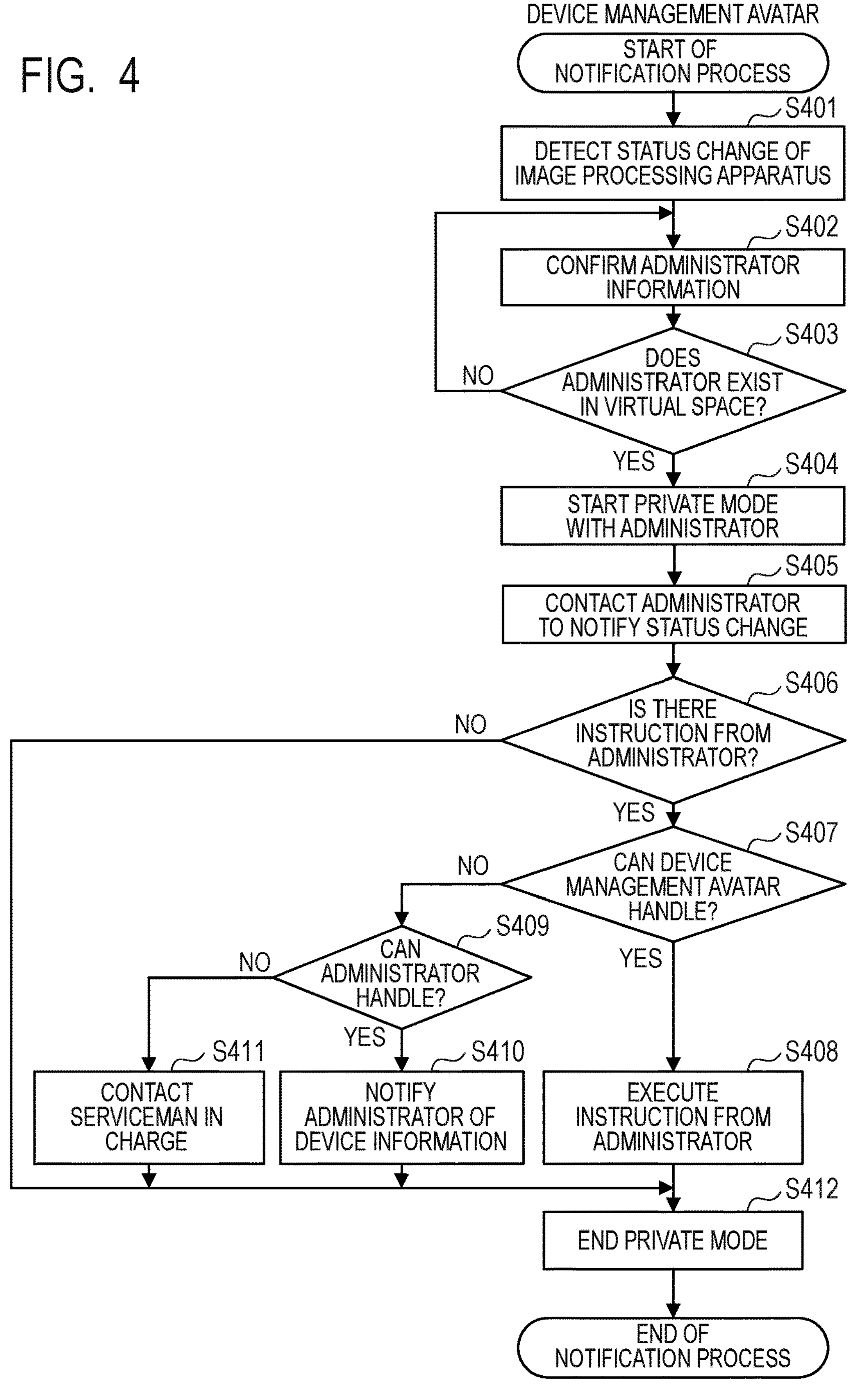
FIG. 4
DEVICE MANAGEMENT AVATAR
START OF NOTIFICATION PROCESS
S401
DETECT STATUS CHANGE OF IMAGE PROCESSING APPARATUS
S402
CONFIRM ADMINISTRATOR INFORMATION
S403
DOES ADMINISTRATOR EXIST IN VIRTUAL SPACE?
NO
YES
S404
START PRIVATE MODE WITH ADMINISTRATOR
S405
CONTACT ADMINISTRATOR TO NOTIFY STATUS CHANGE
S406
IS THERE INSTRUCTION FROM ADMINISTRATOR?
NO
YES
S407
CAN DEVICE MANAGEMENT AVATAR HANDLE?
NO
YES
S409
CAN ADMINISTRATOR HANDLE?
NO
YES
S411
CONTACT SERVICEMAN IN CHARGE
S410
NOTIFY ADMINISTRATOR OF DEVICE INFORMATION
S408
EXECUTE INSTRUCTION FROM ADMINISTRATOR
S412
END PRIVATE MODE
END OF NOTIFICATION PROCESS

DEVICE MANAGEMENT SERVICE SYSTEM, CONTROLLING METHOD OF DEVICE MANAGEMENT SERVICE SYSTEM, AND STORAGE MEDIUM

BACKGROUND

Field

The present disclosure relates to a device management service system for managing network devices, a controlling method of the device management service system, and a storage medium storing a program for realizing the device management service system.

Description of the Related Art

An XR (Cross Reality) has been noted as a generic name of a technique, such as a VR (Virtual Reality) and an AR (Augmented Reality), for combining real and virtual worlds to create a space for providing a simulated experience, and various standardization efforts for the XR have been made.

In recent years, a virtual space or a service utilizing such a technique is called a metaverse, and has been used not only in entertainment applications such as games but also in business scenes such as virtual offices and VR conference rooms (Japanese Patent Application Laid-Open No. 2022-2387).

In a virtual office system, each worker is equipped with an HMD (Head Mounted Display), goes to an office in the virtual space via the HMD as an avatar, and works in the same manner as in a conventional real space. The worker does not complete entire work in the virtual space, but may proceed work in a hybrid of the virtual space and the real space depending on the scene.

For example, the worker may perform printing using an MFP (Multifunction Peripheral) in the virtual space and get a print product in the real space, and the worker may use in the virtual space the data scanned by the MFP in the real space. The MFP is installed in a real-world office and managed by a device management tool/service. The device management tool/service is intended to manage not only the MFP but also network devices including all image processing apparatuses in which users manage consumables and which are repaired by servicemen in charge in sales companies. Examples of the image processing apparatus include a printer, a multifunction peripheral, a 3D printer, a surveillance camera, and the like.

In a customer environment, there is an administrator (also referred to as "a device administrator") that manages network devices such as an image processing apparatus installed in an office in a customer's real world. The device management tool/service described above has a mechanism for notifying the status of the network device installed in the real world to the device administrator in the real world.

However, in the technique of the conventional device management tool/service, there is no mechanism for properly notifying the status of the network device such as the image processing apparatus or the like installed in the real world to the device administrator in the virtual space such as the virtual office system or the like.

SUMMARY

The present disclosure is characterized by a device management service system that manages a network device installed in a real world, and cooperates with a providing system that provides a virtual office corresponding to a service that makes use of a function of the network device by an operation performed by an avatar in the virtual office, the device management service comprising: a notifying unit configured to, based on occurrence of a notification event in the network device, notify as a device management avatar a content of the notification event to an administrator of the network device, in the virtual office; and an accepting unit configured to accept an instruction for the notification event from the administrator via the device management avatar, in the virtual office.

Further features of the present disclosure will become apparent from the following description of exemplary embodiments with reference to the attached drawings.

BRIEF DESCRIPTION OF THE DRAWINGS

FIG. 4 is a flowchart showing a process in which the device management tool/service of the present embodiment notifies event information generated in the device.

DESCRIPTION OF THE EMBODIMENTS

Hereinafter, embodiments of the present disclosure will be described with reference to the accompanying drawings.

Figure 1:
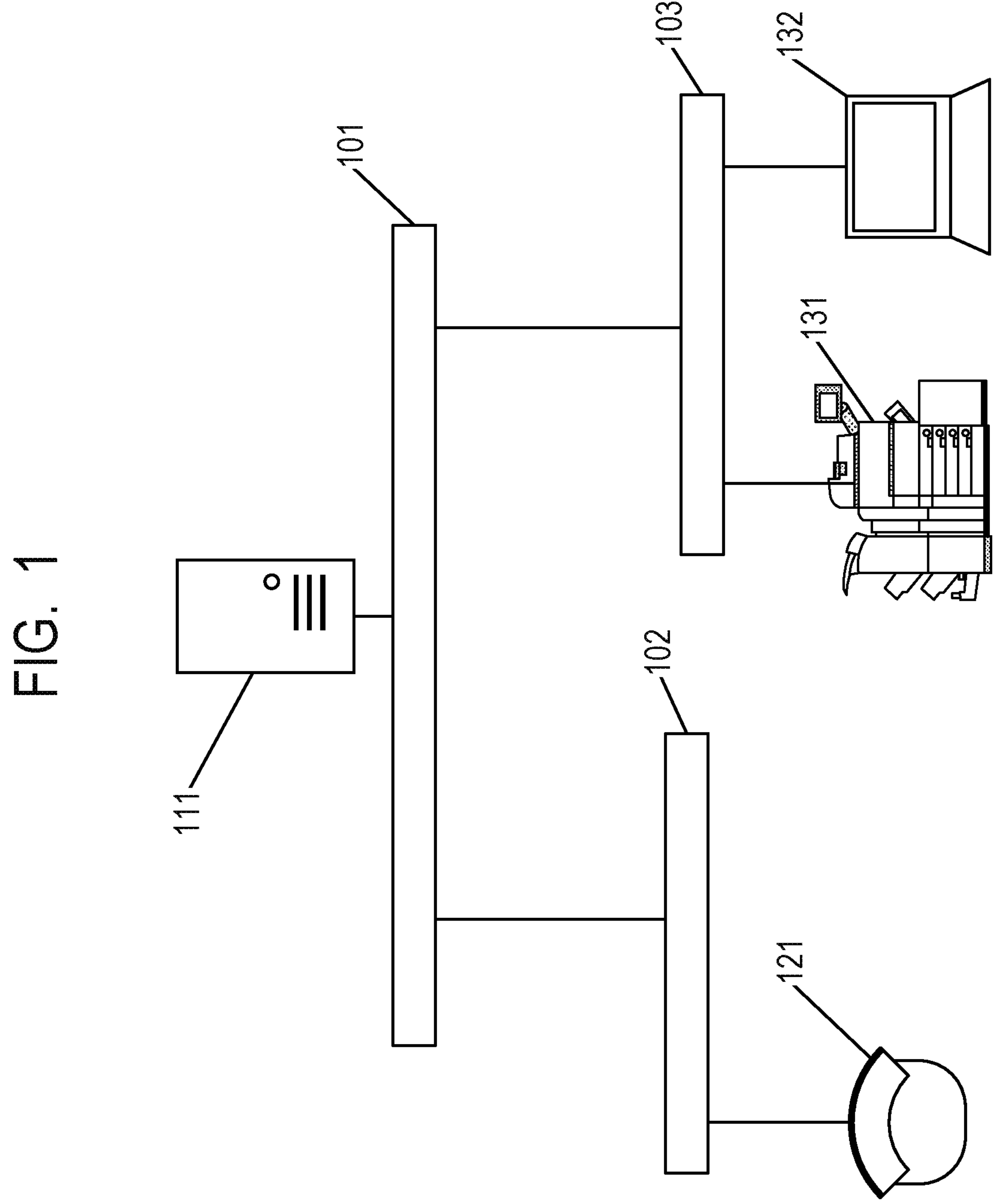
FIG. 1 is a configuration diagram of a device management system in a virtual space according to an embodiment.

FIG. 1 is a diagram showing an example of an overall configuration of a device management system in a virtual space, according to an embodiment of the present disclosure.

As shown in FIG. 1, a virtual space management system 111, a client terminal 121, an image processing apparatus 131 and a device management tool/service 132 are communicably connected via networks 101, 102 and 103.

The networks 101 to 103 are so-called communication networks such as the Internet, which are realized by, for example, a LAN, a WAN, a telephone line, a dedicated digital line, an ATM, a frame relay line, a cable television line, a wireless line for data broadcast, and the like. The networks 101 to 103 may be any networks as long as they can transmit and receive data.

In the present embodiment, the network 101 is assumed to be the Internet, and the networks 102 and 103 are assumed to be the Internet, a wireless LAN (wired or a combination of wired and wireless) set in a network in a general household or a company, or the like.

The client terminal 121 is, for example, dedicated hardware corresponding to drawing of a virtual object handled by an XR (Cross Reality or Extended Reality) such as an HMD (Head Mounted Display) or smart glasses, or a mobile terminal such as a smartphone incorporating a program execution environment.

The client terminal 121 includes a camera for photographing the surroundings, and a display for displaying virtual objects. The client terminal 121 recognizes user's fingers via the camera and superimposes the operation in the real space and the operation in the virtual space, thereby providing a simulated experience in which the real and virtual worlds are fused.

When the client terminal 121 is not dedicated hardware such as a smartphone, drawing of a virtual object is performed using APIs provided by a Web browser, an OS (Operating System) or the like. In the present embodiment, the client terminal 121 will be described as an HMD. Further, there may be the plurality of client terminals 121.

The virtual space management system 111 is a providing system that provides a virtual office corresponding to a service for using, by an operation from an avatar, the function of the image processing apparatus 131, which is a network device installed in the real world, in a virtual space (virtual office) realized in a metaverse.

The virtual space management system 111 is a system for managing and providing virtual objects and user information in the virtual space, an avatar simulating each user, location information thereof, and the like to each client terminal, thereby providing appropriate information to the user.

Further, the virtual space management system 111 performs visualization of the avatar and control of conversation with the avatar, based on authority information and role of the user. The virtual space management system 111 receives login and logout requests from the client terminal 121 and performs login and logout processes. The virtual space management system 111 can be constructed by employing a server computer, a cloud computing technique, or the like. Hereinafter, the user who operates in the virtual space is referred to as the avatar.

Although details will be described later, in a case where an administrator of the image processing apparatus 131 performs a job via the client terminal 121 in the virtual space provided by the virtual space management system 111, the administrator also exists as the avatar in the virtual space. Further, as one of the characteristic configurations of the present embodiment, and will be described later in detail, the device management tool/service 132 is also avatarized in the virtual space provided by the virtual space management system 111.

The function of the virtual space management system 111 described in the present embodiment may be realized by a single server or a single virtual server, or may be realized by a plurality of servers or a plurality of virtual servers. Alternatively, a plurality of virtual servers may be executed on a single server.

The image processing apparatus 131 is an MFP in the present embodiment, and has an image processing function including at least one of printing and scanning. The image processing apparatus 131 is connected to the virtual space management system 111 and the device management tool/service 132 via the network.

The image processing apparatus 131 can also be used in the virtual space by an operation from the avatar.

Therefore, if the avatar instructs the image processing apparatus 131 to perform printing in the virtual space, the printing is executed in the real space, and the user can manually take a print product. The image processing apparatus 131 is also in a status of being monitored and managed by the device management tool/service 132 that can be used by the avatar, even in the virtual space.

The image processing apparatus 131 in the present embodiment is an example of a service providing apparatus that requires consumables managed by a customer and repairs handled by a serviceman. The image processing apparatus 131 includes a printer, a multifunction peripheral, a 3D printer, a surveillance camera, and the like.

The service providing apparatus is a generic term for network devices (apparatuses) capable of providing services in the real world in accordance with instruction contents received via the virtual space management system 111 based on instructions of users who become avatars in the virtual space. Specifically, in the case of the image processing apparatus 131, based on an output instruction of contents in the virtual space, an image process is performed on the contents and the processed contents are output, thereby providing services even in the real world. When providing the service, the consumables of the service providing apparatus is consumed.

The device management tool/service 132 is a device management service system for managing the image processing apparatus 131 which is the network device installed in the real world. The device management tool/service 132 acquires and manages status information such as a counter of the image processing apparatus 131, failure information, and a remaining amount of the consumables via the network. Further, the device management tool/service 132 cooperates with the virtual space management system 111.

(Hardware Configuration)

Figure 2:
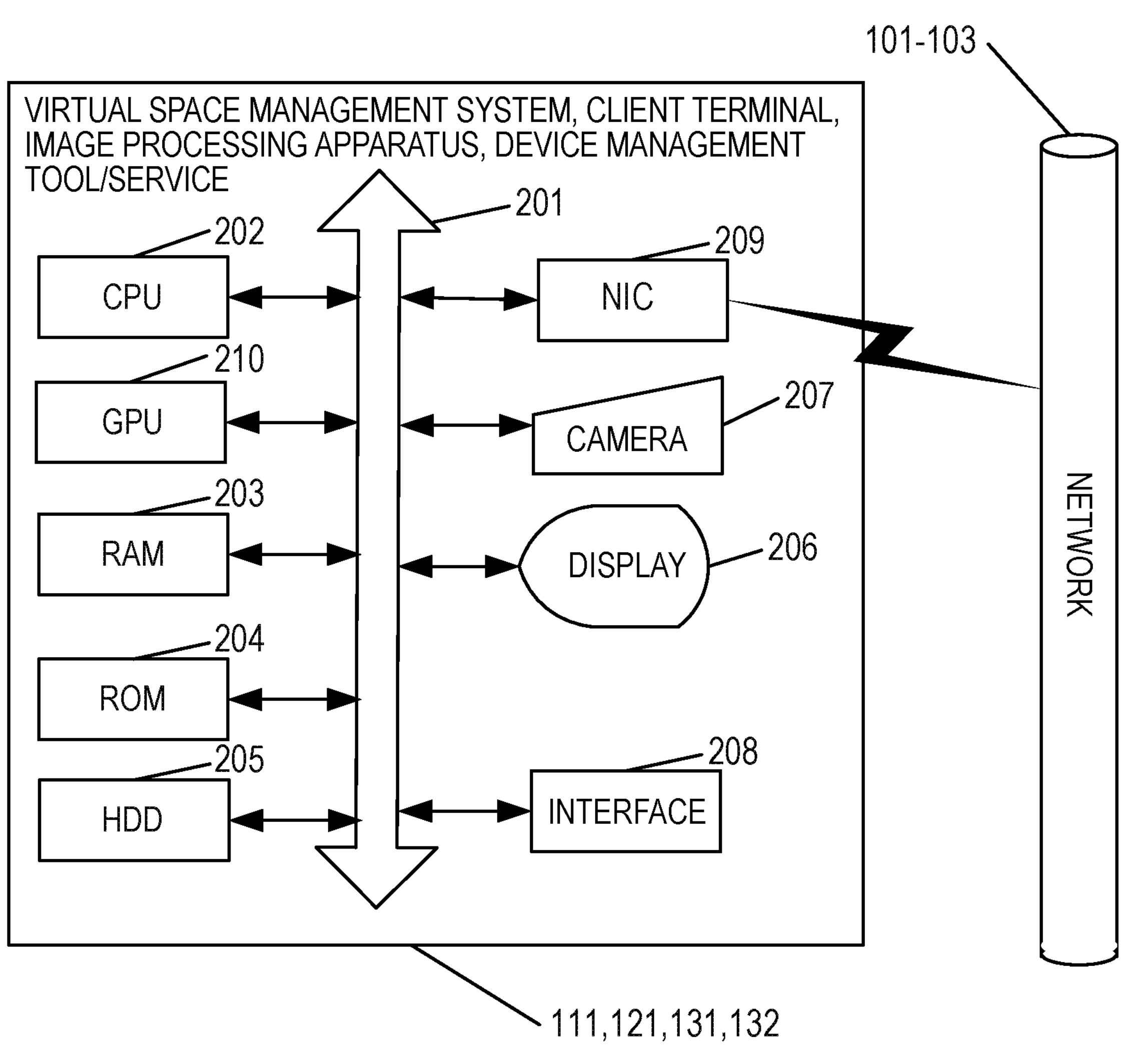
FIG. 2 is a hardware configuration diagram of an apparatus constituting the device management system according to the embodiment.

FIG. 2 is a diagram showing an example of a hardware configuration of each of the virtual space management system 111, the client terminal 121, the image processing apparatus 131, and the device management tool/service 132 according to the present embodiment.

In FIG. 2, a CPU (Central Processing Unit) 202 performs control of the entire apparatus. The CPU 202 executes an application program, an OS and the like stored in an HDD 205, and performs control of temporarily storing information, files and the like necessary for executing the program in a RAM 203.

A GPU (Graphics Processing Unit) 210 performs an arithmetic process necessary for drawing in real time a virtual object or an avatar.

A ROM (Read Only Memory) 204 is a non-volatile storage device, and stores therein various data such as a basic I/O program and the like.

The random-access memory (RAM) 203 is a temporary storage unit, and functions as main memories, work areas and the like of the CPU 202 and the GPU 210.

The HDD (Hard Disk Drive) 205 is one of external storage devices, functions as a large-capacity memory, and stores application programs such as a Web browser, programs of a group of service servers, an OS, related programs, and the like. Instead of or in combination with the HDD, another storage device such as an SSD (Solid State Drive), an eMMC (embedded Multi Media Card) or the like may be provided. When the client terminal 121 is the HMD, a small and lightweight client terminal such as the eMMC is provided.

A display 206 is a display device that displays virtual objects, information necessary for operations, and the like. Further, the display 206 may be a device also having a function of receiving an operation instruction from a user, such as a touch panel. In the case of the virtual space management system 111 and the device management tool/service 132, the display 206 may not be provided. The image processing apparatus 131 includes an operation unit, a printer unit, a scanner unit, and the like (all not shown), and the display 206 is provided in the operation unit.

A camera 207 is an out-camera that photographs a surrounding video image or an in-camera that mainly photographs a user oneself, in the client terminal 121. By analyzing the video image captured by the camera 207, in particular, the out-camera, with an application program stored in the HDD 205, it is possible to synchronize the operation of the finger of the user in the real space with the operation of the finger of the user's avatar in the virtual space. Further, the synchronized finger can also virtually contact virtual objects or other avatars in virtual space displayed on the display 206. In the case of the virtual space management system 111, the image processing apparatus 131, and the device management tool/service 132, the camera 207 may not be provided.

An interface 208 is an external device I/F to which peripheral devices such as various external sensors are connected. Although it is possible to operate the virtual object in the virtual space or contact other avatars by recognizing the user's finger in the real space with the camera 207 described above, the equivalent function can be realized by operating a dedicated controller connected to the interface 208.

A system bus 201 controls the flow of data in the apparatus.

An NIC (Network Interface Card) 209 exchanges data with external devices via the NIC 209 and the networks 101 to 103.

The above computer configuration is an example and is not limited to that shown in FIG. 2. For example, the storage destination of data or programs can be changed by the ROM 204, the RAM 203, the HDD 205 or the like depending on the characteristics. In addition, the CPU 202 and the GPU 210 perform processes based on a program stored in the HDD 205, thereby realizing processes in a software configuration shown in FIG. 3A, FIG. 3B or FIG. 3C.

(Software Configuration)

Figure 3A:
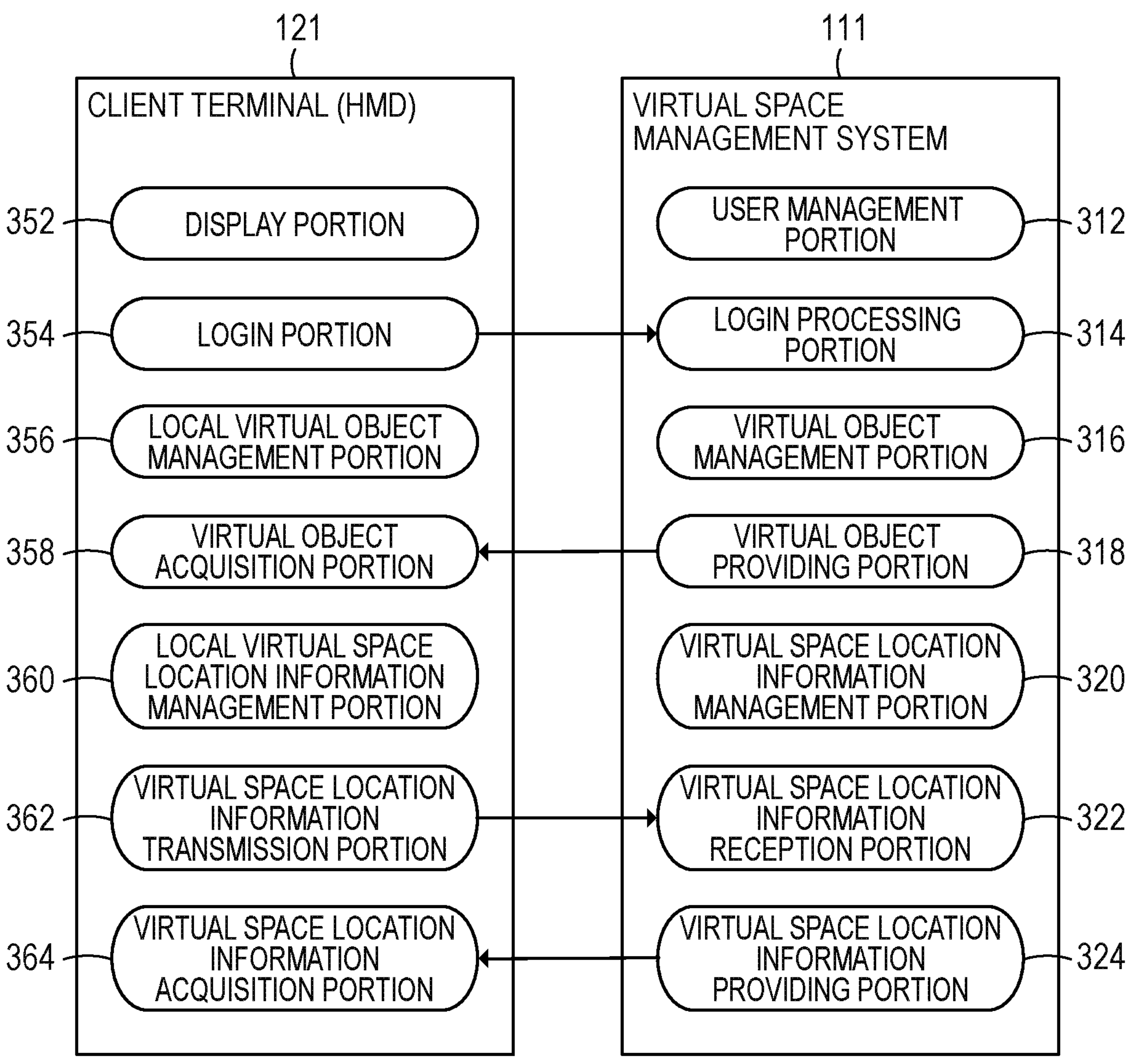
FIG. 3A is a software configuration diagram of a client terminal and a virtual space management system according to the present embodiment.

FIG. 3A is a diagram for describing a software configuration in which the functions related to the present embodiment are extracted among the functions of the virtual space management system 111 and the client terminal 121 of the present embodiment.

First, the software configuration of the virtual space management system 111 will be described.

The virtual space management system 111 includes a user management portion 312 and a login processing portion 314, as user management functions. The virtual space management system 111 includes a virtual object management portion 316, a virtual object providing portion 318, a virtual space location information management portion 320, a virtual space location information reception portion 322 and a virtual space location information providing portion 324, as basic functions for providing virtual spaces. These portions are stored as programs in the HDD 205 or the like of the virtual space management system 111, and correspond to the functions realized by being executed by the CPU 202, the GPU 210 or the like on the RAM 203, for example.

The user management portion 312 manages user information and login information. The login processing portion 314 receives a login request from the client terminal 121, checks the login request against the information of the user management portion 312, and returns a login processing result to the client terminal 121.

Table 1 shows an example of a user information management table managed by the user management portion 312.

TABLE 1

User Information Management Table

| User ID | Password | Login Status | Login Expiration Date | Role | Object ID | . . . |
|---|---|---|---|---|---|---|
| user A | ******** | on | 20xx/xx/xx xx:xx | administrator | xxxxxxxx | . . . |
| user B | ***** | on | 20xx/xx/xx xx:xx | ordinary person | xxxxxxxx | . . . |
| user C | ******* | off | 20xx/xx/xx | ordinary person | xxxxxxxx | . . . |
| . | . | . | . | | . | . |
| . | . | . | . | | . | . |
| . | . | . | . | | . | . |

In the user information management table of Table 1, the "User ID" indicates an ID uniquely identifying a user. The "Password" indicates a password for basic authentication used when the user ID is logged in. The login processing portion 314 checks the combination of the user ID and the password included in the login request from the client terminal 121 with the user information management table as shown in Table 1. When they match, the login processing portion 314 returns the login result to each client terminal as success.

The "Login Status" indicates a user's login status, "on" indicates a login status, and "off" indicates a logout status. The "Login Expiration Date" indicates an expiration date of an authentication status of a logged-in user.

The "Role" is an authority assigned to the user by an administrator. The "Role" is used by the virtual space management system 111 to control the operation of an avatar in the virtual space, such as whether or not a target user can utilize a certain service in the virtual space. The virtual space management system 111 controls visualization of the avatar and conversation with the avatar, based on the role of the user.

The "Object ID" is an ID for linking 3D data indicating the appearance of the avatar in the virtual space of the user with the user ID.

The virtual object management portion 316 manages the virtual objects arranged in the virtual space, the 3D data of the avatars of the respective users, and the like.

The virtual object providing portion 318 provides the 3D data managed by the virtual object management portion 316 to the client terminal 121.

The virtual space location information management portion 320 manages the location information of the virtual objects and the avatars managed by the virtual object management portion 316.

Table 2 shows an example of the location information of each user (avatar) managed by the virtual space location information management portion 320.

TABLE 2

Avatar Location Information Management Table

| User ID | Space ID | Coordinates |
|---|---|---|
| user A | room A | (100, 100, 5) |
| user B | room A | (100, 104, 5) |
| user C | room B | (50, 25, 3) |
| . | . | . |
| . | . | . |
| . | . | . |

In the avatar location information management table of Table 2, the "User ID" is an ID uniquely identifying a user.

The "Space ID" is an ID uniquely identifying a virtual space. The "Coordinates" is information indicating the current location of the avatar.

The virtual space location information reception portion 322 has a function of receiving the location information from the client terminal 121 periodically or when the location of the virtual object or the avatar in the virtual space is changed by an operation from the client terminal 121.

The virtual space location information providing portion 324 provides the client terminal 121 with the location information of the virtual objects and the avatars in the virtual space managed by the virtual space location information management portion 320.

Next, the software configuration of the client terminal 121 will be described.

The client terminal 121 includes a display portion 352, a login portion 354, a local virtual object management portion 356, and a virtual object acquisition portion 358. Further, the client terminal 121 includes a local virtual space location information management portion 360, a virtual space location information transmission portion 362, and a virtual space location information acquisition portion 364. These portions are stored as programs in the ROM 204, the eMMC (HDD) 205 or the like of the client terminal 121, and correspond to the functions realized by being executed by the CPU 202 or the like on the RAM 203, for example.

The display portion 352 displays the virtual objects and the avatars in the virtual space via the display 206 of the client terminal 121.

The login portion 354 transmits, to the login processing portion 314 of the virtual space management system 111, the user name and the password input by the user's finger photographed by the camera 207 of the client terminal 121, or an input device connected to the interface 208 of the client terminal 121.

An authentication method for the virtual space management system 111 may be face authentication using a face image photographed by the camera 207 of the client terminal 121, iris authentication using iris, fingerprint authentication using a fingerprint sensor connected to the interface 208 of the client terminal 121, or the like.

The local virtual object management portion 356 manages, on the client terminal 121, the information such as the virtual object, the 3D data of the avatar and the like acquired from the virtual space management system 111.

The virtual object acquisition portion 358 acquires the information such as the virtual object, the 3D data of the avatar and the like from the virtual object providing portion 318 of the virtual space management system 111, and stores the acquired information in the local virtual object management portion 356.

The local virtual space location information management portion 360 manages the location information of the avatar in the virtual space as shown in Table 2 acquired from the virtual space management system 111. The local virtual space location information management portion 360 also has a function of detecting the location of the avatar on the own terminal that has changed by the operation of the client terminal 121 and storing the location information in the local virtual space location information management portion 360 itself.

The virtual space location information transmission portion 362 transmits the location information of the avatar to the virtual space location information reception portion 322 of the virtual space management system 111 periodically or when the location information of the avatar in the virtual space is changed by an operation of the client terminal 121.

The virtual space location information acquisition portion 364 periodically acquires the location information of the avatar from the virtual space location information providing portion 324 of the virtual space management system 111, and stores the acquired location information in the local virtual space location information management portion 360.

By the respective functions of the portions 352 to 364 above, the behavior and status of the avatar in the virtual space provided by the virtual space management system 111 can be reflected on the display 206 of the client terminal 121 in real time.

Figure 3B:
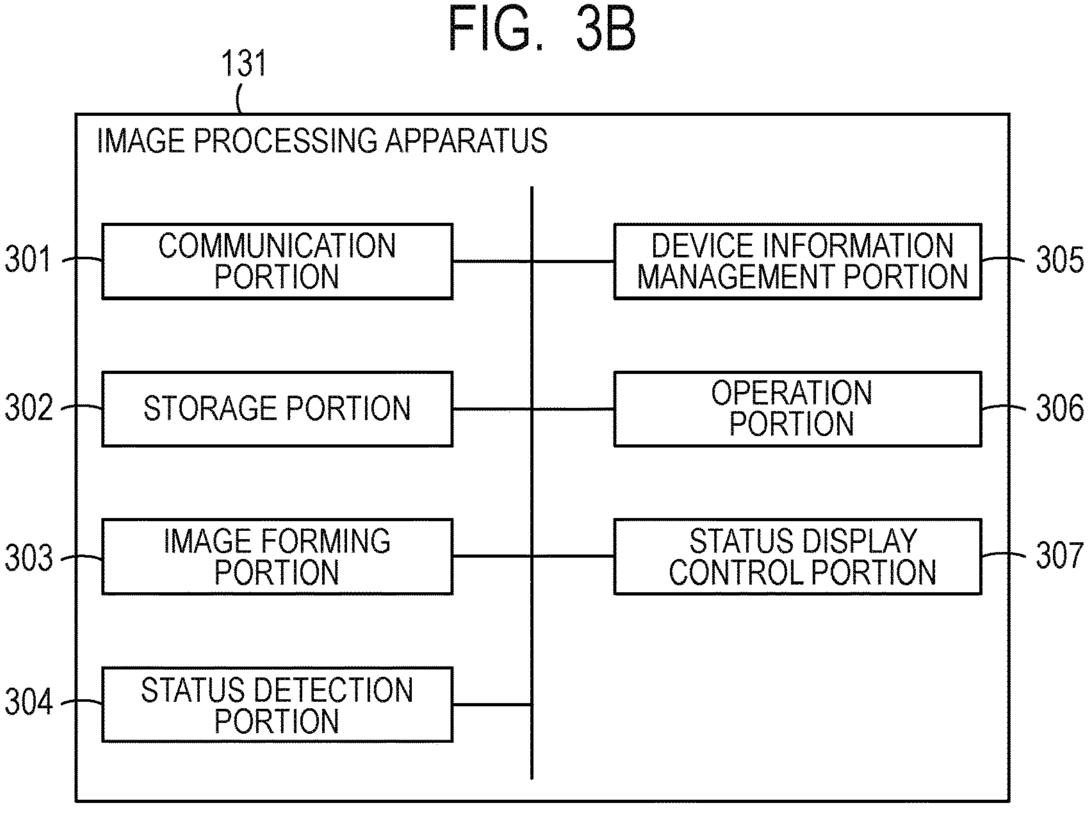
FIG. 3B is a software configuration diagram of an image processing apparatus according to the present embodiment.

FIG. 3B is a diagram for describing a software configuration of the image processing apparatus 131 according to the present embodiment.

The image processing apparatus 131 includes a communication portion 301, a storage portion 302, an image forming portion 303, a status detection portion 304, a device information management portion 305, an operation portion 306, and a status display control portion 307. These portions are stored as programs in the ROM 204 of the image processing apparatus 131, and correspond to the functions realized by being executed by the CPU 202 on the RAM 203.

The communication portion 301 communicates with the device management tool/service 132. The device management tool/service 132 communicates with the communication portion 301 to acquire device information about the image processing apparatus 131 above.

The storage portion 302 exchanges information with storage areas of the RAM 203, the ROM 204 and the HDD 205 of the image processing apparatus 131. The storage portion 302 also stores an operation history of the image processing apparatus 131, data indicating various abnormal statuses, and the like.

The image forming portion 303 has a function of generating and outputting print data.

The status detection portion 304 monitors the status of the image processing apparatus 131. The status detection portion 304 detects various statuses, such as a fault and an open/close status of a cover (hereinafter referred to as an "event") detected by a sensor, a return status thereof, and a status of a residual toner amount, and the like, and notifies the respective control portions of the detected statuses.

The device information management portion 305 generates the information to be transmitted to the device management tool/service 132 or acquired by the device management tool/service 132, from the information detected by the status detection portion 304.

The operation portion 306 is an interface that enables an operation instruction to the image processing apparatus 131, such as a print instruction by a customer user.

The status display control portion 307 performs display control of the status information of the image processing apparatus 131, for a status bar or the like of the display 206 of the image processing apparatus 131.

Figure 3C:
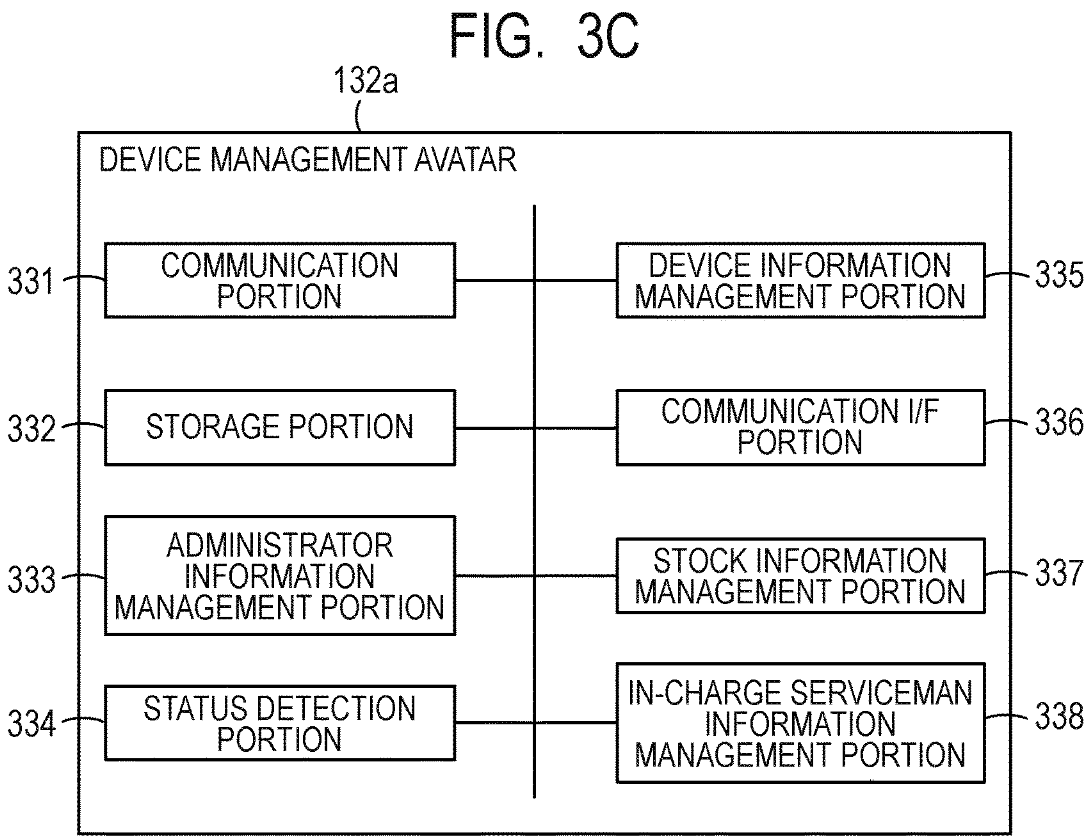
FIG. 3C is a software configuration diagram of a device management tool/service according to the present embodiment.

FIG. 3C is a diagram for describing a software configuration of the device management tool/service 132 according to the present embodiment.

The device management tool/service 132 exists as a device management avatar 132*a* (FIG. 5) in the virtual space provided by the virtual space management system 111. In the following description, a user interface (UI) of the device management tool/service 132 in the virtual space is referred to as the "device management avatar 132*a*". Therefore, each portion of the device management tool/service 132 shown in FIG. 3C can be referred to as a function of the device management avatar 132*a* in the virtual space.

The device management tool/service 132 includes a communication portion 331, a storage portion 332, an administrator information management portion 333, a status detection portion 334, a device information management portion 335, a communication I/F portion 336, a stock information management portion 337, and an in-charge serviceman information management portion 338.

These portions are stored as programs in the HDD 205 or the like of the device management tool/service 132, and correspond to the functions realized by being executed by the CPU 202 or the like on the RAM 203, for example.

The communication portion 331 is used for communicating with the image processing apparatus 131 and the virtual space management system 111, such as acquiring the device information of the image processing apparatus 131, as described above.

The storage portion 332 stores the acquired device information, administrator information of a customer, and the like.

The administrator information management portion 333 manages the information on the administrator of the customer who performs stock control of the consumables related to the image processing apparatus 131 and performs maintenance operations such as a vendor contact at the time of occurrence of a failure.

The administrator information managed by the administrator information management portion 333 is information as shown in an administrator information management table of Table 3.

TABLE 3

Administrator Information Management Table

| Name of Administrator | User ID | Telephone Number | Mail Address | Space ID | Coordinates | . . . |
|---|---|---|---|---|---|---|
| administrator A | user A | ********* | xxxxx@mail.xx | room A | (100, 100, 5) | . . . |

The administrator (device administrator) on the customer side exists as an avatar in the virtual space management system 111, and in the following description, the administrator on the customer side in the virtual space is referred to as an "administrator avatar".

The device management tool/service 132 inquires the virtual space management system 111 about the location information of the administrator avatar by the user ID at a timing when the device management avatar 132*a* contacts the administrator avatar. In response to this inquiry, the virtual space management system 111 provides the device management tool/service 132 with the space ID and the coordinates respectively corresponding to the user ID as the location information of the administrator avatar.

The status detection portion 334 detects a change in the status of the image processing apparatus 131, and determines whether or not to acquire the device information in accordance with the change. In the present embodiment, the status change is detected by the device management tool/service 132. However, the status change may be notified from the side of the image processing apparatus 131, and the device management tool/service 132 may acquire the notified status change accordingly.

The device information management portion 335 manages the device information, such as subtraction of the stock of the consumables and information processing as necessary, based on the various kinds of device information acquired from the image processing apparatus 131.

The communication I/F portion 336 is for the device management avatar 132*a* to perform voice conversation with other avatars. For example, the status of the image processing apparatus 131 can be notified to the administrator avatar to which the device management avatar 132*a* has authorization, via the communication I/F portion 336. It is also possible for the administrator avatar having authorization to provide or register various information by instructing the device management avatar 132*a* via the communication I/F portion 336. In the real space, the communication I/F portion 336 represents a UI where the device administrators can view the device information and register other information.

The stock information management portion 337 manages stock information related to the consumables of the image processing apparatus 131, and performs the subtraction of the stock when there is information representing that the consumables approach the lifetime in the acquired device information. Further, the stock information management portion 337 accepts and processes adjustment of the quantity of stock by the administrator avatar in response to replenishment of the stock in the real space.

The in-charge serviceman information management portion 338 manages in-charge person information of a sales company or a dealer that performs maintenance or the like of the image processing apparatus 131, as in an in-charge serviceman information management table shown in Table 4. Thus, the device management tool/service 132 can make contact with a serviceman in charge such as a repair request.

TABLE 4

In-Charge Serviceman Information Management Table

| Name of In-Charge Serviceman | Name of Company | Telephone Number | Mail Address | . . . |
|---|---|---|---|---|
| Customer Engineer A | A | ********** | xxxxx@mail.xx | . . . |

FIG. 4 is a flowchart for describing a process of providing the device management avatar 132*a* based on detection of the device management tool/service 132 in response to a status change of the image processing apparatus 131 and reception of an event by the device management tool/service 132. The process of this flowchart is realized by the CPU 202 or the like of the device management tool/service 132 reading out the program stored in the HDD 205 or the like to the RAM 203 and executing the read program.

In S401, the device management tool/service 132 detects the status change of the image processing apparatus 131 by the status detection portion 334. The status change means statuses such as a paper jam, a failure requiring help of a serviceman, a small remaining amount of the consumables, and a no remaining amount of the consumables. When the device management tool/service 132 detects the status change of the image processing apparatus 131 in S401, the device management tool/service 132 advances the process to S402.

In S402, the device management tool/service 132 confirms the administrator information of the customer managed by the administrator information management portion 333, and identifies the administrator. Specifically, at the timing when the status change is detected, the administrator avatar of the customer is confirmed (identified) where in the virtual space (the virtual space capable of providing the device management avatar 132*a*) based on the administrator information of the customer. Here, when it is confirmed that the administrator avatar exists in the virtual space (YES in S403), the device management tool/service 132 advances the process to S404.

On the other hand, when it is confirmed that the administrator avatar does not exist in the virtual space (NO in S403), the device management tool/service 132 returns the process to S402. Thus, the device management tool/service 132 waits until the administrator of the customer logs in the virtual space management system 111 and the administrator avatar appears in the virtual space. In the present embodiment, the device management tool/service 132 stands by, however, if the administrator avatar does not appear in the virtual space even after a certain period of time has elapsed, the process may be terminated, and a notification message may be left in such a manner that the event occurred in the image processing apparatus 131 can be grasped when the administrator of the customer logs in the virtual space.

In S404, the device management tool/service 132 starts a private mode. The private mode is started by requesting the virtual space management system 111, whereby the conversation between the device management avatar 132*a* and the administrator avatar cannot be heard by other avatars.

In S405, the device management tool/service 132 notifies the administrator avatar in the virtual space of the status change detected in S401 via the device management avatar 132*a*.

In detail, the device management tool/service 132 provides the device management avatar 132*a* in the virtual space and causes the device management avatar 132*a* to move to and approach (contact) the location of the administrator avatar. At this time, for example, the device management tool/service 132 transmits, to the virtual space management system 111, the location information to be the movement destination of the device management avatar 132*a* in the virtual space. Further, the device management tool/service 132 performs control so that the device management avatar 132*a* notifies the status change to the administrator avatar by the conversation between the device management avatar 132*a* and the administrator avatar. This notification will be described with reference to FIG. 5.

Figure 5:
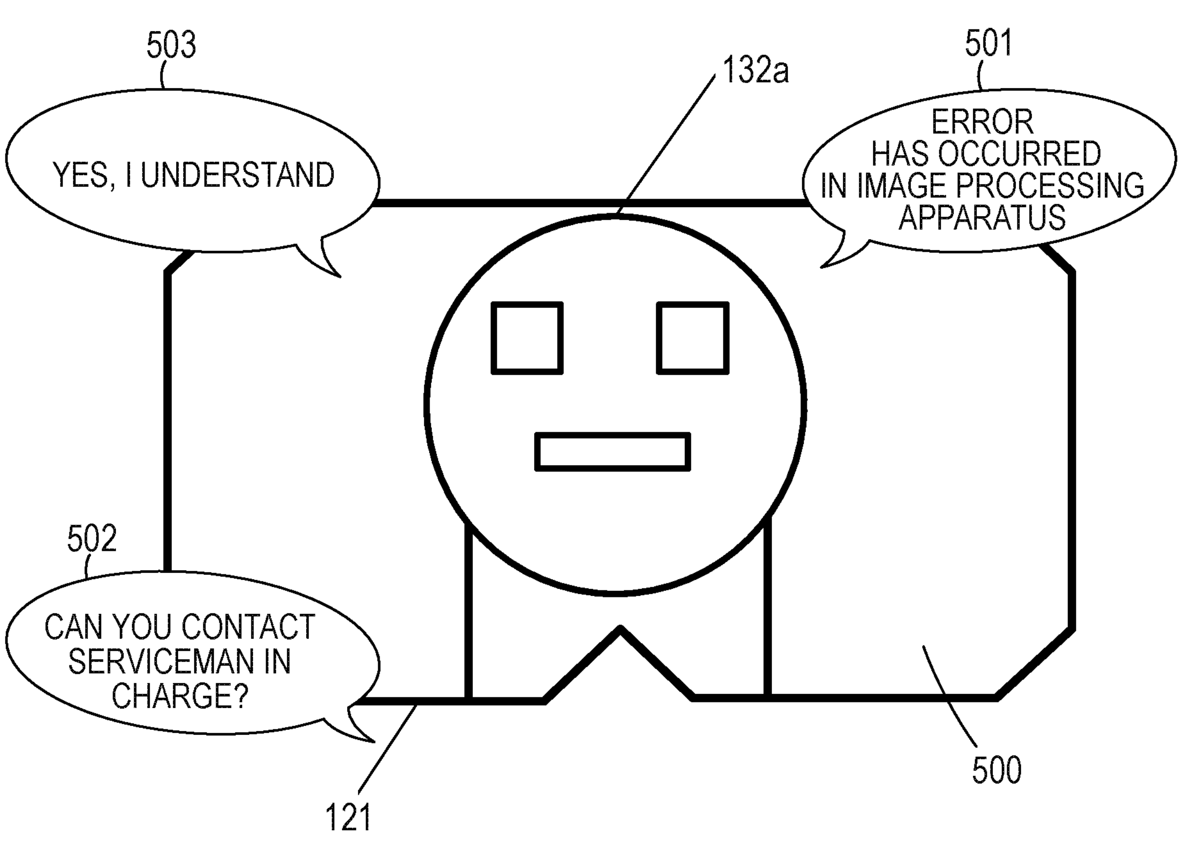
FIG. 5 is a diagram showing an event notification image of a device management avatar from the viewpoint of a client terminal according to the embodiment.

FIG. 5 is a diagram showing an example of an event notification image of the device management avatar from the viewpoint of the client terminal according to the present embodiment. This image corresponds to an image in which the device management avatar 132*a* notifies the administrator avatar of error occurrence in the image processing apparatus 131 in a status where the administrator of the customer wears the client terminal 121 and logs in to the virtual space.

A screen 500 corresponds to an example of a screen displayed on the display 206 of the client terminal 121 in a status where the administrator wears the client terminal 121 and logs in to the virtual space.

In the example shown in FIG. 5, a status change notification 501 is performed from the device management avatar 132*a* to the administrator avatar.

After the notification in S405, the device management tool/service 132 advances the process to S406. In S406, the device management tool/service 132 confirms, via the device management avatar 132*a*, whether or not there is the instruction regarding the occurred status change of the image processing apparatus 131. Here, when there is no instruction from the administrator avatar (NO in S406), the device management avatar 132*a* advances the process to S412, ends the private mode, and ends the process of this flowchart.

On the other hand, when there is the instruction from the administrator avatar (YES in S406), the device management avatar 132*a* advances the process to S407.

In the example shown in FIG. 5, an instruction 502 regarding the event of the notification 501 is issued from the administrator avatar to the device management avatar 132*a*.

In S407, the device management tool/service 132 confirms whether or not the instruction of the administrator avatar can be handled. The instruction that can be handled is, for example, an instruction such as ordering of the image processing apparatus 131 in response to stockout of the consumables. By registering in the device management tool/service 132 a threshold value for stock ordering by the administrator avatar, a contact destination of the ordering, and the like in advance, it is possible to handle such a problem. Further, an instruction such as reboot of the image processing apparatus 131 is also an instruction that can be handled.

When the instruction of the administrator avatar is the instruction that can be handled (YES in S407), the device management tool/service 132 advances the process to S408. In S408, the device management tool/service 132 executes the instruction from the administrator avatar.

For example, in the case where the instruction is an order request for the consumables, the device management tool/service 132 executes the process for ordering the consumables to an external service via the network. When the instruction is a reboot request of the image processing apparatus 131, the device management tool/service 132 issues a reboot command to the image processing apparatus 131 via the network. After that, the device management tool/service 132 ends the private mode (S412), and ends the process of this flowchart.

In the example shown in FIG. 5, the instruction 502 from the administrator avatar to the device management avatar 132*a* can be handled, and a reply 503 indicating that the device management avatar 132*a* has accepted the instruction is performed.

When the instruction of the administrator avatar is not the instruction that can be handled (NO in S407), the device management tool/service 132 advances the process to S409.

In S409, the device management tool/service 132 confirms whether or not the instruction is handled by the administrator avatar (the instruction is handled by the administrator in the real space). This confirmation may be made by the device management tool/service 132 based on its own judgment, or may be made by the device management tool/service 132 based on as an instruction the notification indicating that the administrator avatar itself handles.

When it is confirmed that the instruction is handled by the administrator avatar (YES in S409), the device management tool/service 132 advances the process to S410. In S410, the device management tool/service 132 notifies the administrator avatar of the device information. For example, since the handling of the paper removal at the time of paper jam occurrence is performed by the customer administrator in the real space instead of the virtual space, the administrator avatar is notified of information such as the installation location, model, serial number and the like of the target device required at that time in S410. After that, the device management tool/service 132 ends the private mode (S412), and ends the process of this flowchart.

On the other hand, when it is confirmed that the instruction is not handled by the administrator avatar (NO in S409), the device management tool/service 132 advances the process to S411. In S411, the device management tool/service 132 notifies the serviceman in charge of the image processing apparatus 131. In other words, when the instruction is a handling request to a maintenance service of the network device, the device management tool/service 132 executes a process for connection to the maintenance service and performs the handling request according to the notification. Thereafter, the device management tool/service 132 ends the private mode (S412), and ends the process of this flowchart.

By the above processes, the device administrator on the customer side can be notified by the device management avatar of an abnormality of the image processing apparatus at a proper timing in the virtual space. Further, when the information is acquired from the device management avatar, the instruction can be issued if the avatar can handle the instruction. That is, in a case where a real-world office and a virtual office realized in the metaverse are used in combination, it is possible to easily manage the network devices, thereby reducing a load on the administrator.

In the present embodiment, the case where the information is not shared by other avatars by using the private mode for the exchange between the device management avatar 132*a* and the administrator avatar has been described, but this may be set optionally. Alternatively, instead of the private mode, the virtual space management system 111 may set both the device management avatar 132*a* and the administrator avatar to be invisible to other avatars at a timing when the device management avatar 132*a* contacts the authorized avatar.

Further, in a case where the image processing apparatus 131 can be handled only by the serviceman in charge (NO in S409), not only the contact but also the serviceman in charge having special authority may be invited to the site as a serviceman avatar, and the handling may be instructed.

Further, as for a customer for whom the device management tool/service, i.e., the device management avatar 132*a*, is not introduced, the image processing apparatus 131 itself may be avatarized in the virtual space provided by the virtual space management system 111. In this case, the avatar of the image processing apparatus 131 may notify the own status to the customer's administrator avatar or other avatars by expressions, voices, balloons and the like.

The configurations of the virtual space management system 111, the client terminal 121, the image processing apparatus 131 and the device management tool/service 132 (device management avatar 132*a*), and the configuration of the software modules have been described. In addition, the notification process flow of the device management avatar 132*a* to the administrator avatar has been described. However, these descriptions are merely examples, and the present disclosure is not limited thereto.

The network device managed by the device management tool/service 132 is not limited to the image processing apparatus, and can be applied to various network devices. For example, various devices operating in an office, a factory or the like may be managed by the device management tool/service 132, and the device management avatar 132*a* may notify the statuses of these devices to an avatar (administrator avatar) in the virtual space of the administrator who manages these devices. Further, the device management avatar 132*a* may accept an instruction from the administrator avatar and execute process or the like according to the accepted instruction.

In the embodiment described above, the device management tool/service 132 notifies, in the virtual office, as the device management avatar 132*a* the administrator of the network device of the contents of the notification event, based on the occurrence of the notification event in the network device. Thus, information such as an abnormality occurring in the network device in the virtual space using AR or VR can be provided to the device administrator of the customer by the avatarized device management tool/service 132.

The device management tool/service 132 accepts the instruction for the notification event from the administrator in the virtual office via the device management avatar 132*a*. Thus, the administrator can easily issue an instruction for the notified abnormality or the like in the virtual space. Therefore, the administrator on the customer side can realize in a metaverse space (virtual office) the device management of the network device installed in the real world.

As a result, in the case where the real-world office and the virtual office realized in the metaverse are used in combination, it is possible for the administrator to easily manage the network devices and reduce the management load.

According to the present disclosure, it is possible to realize the device management of the network devices installed in the real world from the virtual office. As a result, the management load on the network devices by the administrator can be reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-000457, filed Jan. 5, 2023, which is hereby incorporated by reference herein in its entirety.

What is claimed is:

1. A device management service system that manages a network device installed in a real world, and cooperates with a providing system that includes one or more servers and provides a virtual office corresponding to a service that makes use of a function of the network device by an operation performed by an avatar in the virtual office, the device management service system comprising:

one or more memories storing instructions, and one or more processors capable of executing the instructions causing the device management service system to:

send, to the providing system, a request for location information of an administrator avatar of an administrator of the network device;

receive, from the providing system, coordinates corresponding to a location of the administrator avatar in the virtual office;

based on occurrence of a notification event in the network device, use the coordinates to locate the administrator avatar and notify a content of the notification event to the administrator of the network device via a device management avatar in the virtual office; and receive, via the device management avatar in the virtual office, an instruction for the notification event from the administrator.

2. The device management service system according to claim 1, wherein the instructions further cause the device management service system to cause, so as to notify the content of the notification event, the device management avatar to approach in the virtual office the administrator avatar of the administrator logged in the virtual office.

3. The device management service system according to claim 2, wherein the instructions further cause the device management service system to perform a conversation between the device management avatar and the administrator avatar in the virtual office as notifying the content of the notification event.

4. The device management service system according to claim 1, wherein the instructions further cause the device management service system to identify the administrator of the network device for which the notification event has occurred.

5. The device management service system according to claim 1, wherein the function of the network device is an image processing function including at least one of printing and scanning, and wherein the notification event is a notification event related to an abnormality on the image processing function.

6. The device management service system according to claim 1, wherein the instructions further cause the device management service system to execute, in a case where the received instruction is an order request of consumables, a process for ordering the consumables to an external service via a network.

7. The device management service system according to claim 1, wherein the instructions further cause the device management service system to issue, in a case where the received instruction is a reboot request of the network device, a reboot command to the network device via a network.

8. The device management service system according to claim 1, wherein the instructions further cause the device management service system to execute, in a case where the received instruction is a handling request to a maintenance service of the network device, a process for connecting the maintenance service.

9. The device management service system according to claim 1, wherein the instructions further cause the device management service system to invite, in a case where the received instruction is a handling request to a maintenance service of the network device, an avatar of a serviceman corresponding to the maintenance service to the virtual office.

10. The device management service system according to claim 1, wherein the virtual office is provided in a metaverse.

11. A method of controlling a device management service system that manages a network device installed in a real world, and cooperates with a providing system that includes one or more servers and provides a virtual office corresponding to a service for using a function of the network device by an operation from an avatar in the virtual office, the method comprising:

sending, to the providing system, a request for location information of an administrator avatar of an administrator of the network device;

receiving, from the providing system, coordinates corresponding to a location of the administrator avatar in the virtual office;

based on occurrence of a notification event in the network device, using the coordinates to locate the administrator avatar and notify a content of the notification event to the administrator of the network device via a device management avatar in the virtual office; and receiving, via the device management avatar in the virtual office, an instruction for the notification event from the administrator.

12. A non-transitory computer-readable storage medium storing instructions that, when executed by one or more processors of a device management service system that manages a network device installed in a real world, and cooperates with a providing system that includes one or more servers and provides a virtual office corresponding to a service for using a function of the network device by an operation from an avatar in the virtual office, cause the device management service system to perform a control method comprising:

sending, to the providing system, a request for location information of an administrator avatar of an administrator of the network device;

receiving, from the providing system, coordinates corresponding to a location of the administrator avatar in the virtual office;

based on occurrence of a notification event in the network device, using the coordinates to locate the administrator avatar and notify a content of the notification event to the administrator of the network device via a device management avatar in the virtual office; and receiving, via the device management avatar in the virtual office, an instruction for the notification event from the administrator.

* * * * *